United States Patent
Savini

(10) Patent No.: US 7,269,849 B2
(45) Date of Patent: *Sep. 11, 2007

(54) METHOD AND SYSTEM FOR ACCESS TO DEVELOPMENT ENVIRONMENT OF ANOTHER

(75) Inventor: Patrice Savini, Cagnes-sur-Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 768 days.

This patent is subject to a terminal disclaimer.

(21) Appl. No.: 10/615,263

(22) Filed: Jul. 8, 2003

(65) Prior Publication Data

US 2004/0230841 A1    Nov. 18, 2004

(30) Foreign Application Priority Data

May 2, 2003    (EP)    .................................. 03291079

(51) Int. Cl.
*G06F 9/00* (2006.01)

(52) U.S. Cl. ........................... 726/12; 726/15; 370/351

(58) Field of Classification Search ................. 726/15, 726/12; 370/351
See application file for complete search history.

(56) References Cited

U.S. PATENT DOCUMENTS

| 6,453,348 | B1 |   | 9/2002 | Barnier et al. |
| 6,920,502 | B2 | * | 7/2005 | Araujo et al. ............... 709/229 |
| 7,117,526 | B1 | * | 10/2006 | Short ............................ 726/5 |
| 2002/0032725 | A1 | * | 3/2002 | Araujo et al. ............... 709/203 |
| 2002/0144144 | A1 |   | 10/2002 | Weist et al. |

FOREIGN PATENT DOCUMENTS

WO    WO 01/41392 A2    7/2001

OTHER PUBLICATIONS

David J. Korsmeyer et al., "IsoWAN: A NASA Science and Engineering Information and Services Framework" IEEE Conference Proceedings, pp. 534-539, Jul. 3, 2000.
"Product Training VPN" web.archive.org. Online! Feb. 12, 2002.
Gerhard Glaser, "VPN" web.archive.org, Online! Feb. 2, 2002.

* cited by examiner

*Primary Examiner*—Kim Vu
*Assistant Examiner*—April Y. Shan
(74) *Attorney, Agent, or Firm*—W. James Brady; Frederick J. Telecky, Jr.

(57) ABSTRACT

A highly secure "Design Zones" system is described that promotes collaboration between a manufacturer and owner of compute systems and its partners such as sub-contractors, customers and suppliers offers flexibility in the compute and design process. A partner starts a VPN tunnel between his workstations to establish a secure encrypted tunnel end to end wherein each partner is identified with a different VPN group/password. A session is started by the partner in a Web page on a portal machine through a thin client technology that authenticates thru LDAP the user/password of the person. The session is routed to an engagement box depending on the person where the engagement boxes are on network segments such as Ethernet separated by firewall boxes with another logon/password and is validated thru second LDAP and wherein all users of the same partner are all launching on the same box; and accessing data and applications from that engagement box on Network File System (NFS) storage authenticated LDAP to get benefit of a big compute farm composed of many high end servers in a very secure way.

14 Claims, 5 Drawing Sheets

METHOD AND SYSTEM FOR ACCESS TO DEVELOPMENT ENVIRONMENT OF ANOTHER

CROSS-REFERENCE TO RELATED APPLICATIONS

This application corresponds to and claims priority under 35 U.S.C.§119 European patent application serial no. 03291079.6 filed May 2, 2003 (TI-35374EP) entitled "Method and System for Access to Development Environment of Another" and which is assigned to Texas Instruments Incorporated.

FIELD OF INVENTION

This invention relates to a method and system for access to the development environment of another using the Internet and more particularly to a method of collaboration with partners such as sub-contractors, customers and suppliers.

BACKGROUND OF INVENTION

The complexity of system designs is increasing exponentially. This is particularly a concern for integrated circuit manufacturers such as Texas Instruments Incorporated. The time to market is more and more critical for success. It is believed that collaboration with customers and suppliers is the key to faster, easier, cheaper and more accurate interactions.

The collaboration can be improved by allowing the customers and suppliers (partners) to use their compute resources. The problem with that is having the data leaving the owner for validating, simulation, layout, etc.

It is therefore an object of the present invention for manufacturer's such as Texas Instruments Incorporated to give access to partners such as sub-contractors, customers and Electronic Design Automation (EDA) vendors to the manufacturer's design systems computing environment without compromising Intellectual Property.

SUMMARY OF INVENTION

In accordance with one embodiment of the present invention access from partner's sub-contractors, customers and Electronic Design Automation (EDA) vendors to a manufacturer's (owner's) such as Texas Instruments Incorporated design systems computing environment without compromising Intellectual Property is provided by a full suite of Design Automation applications from design to production is provided by a highly secure network including a VPN tunnel between workstations to establish a secure encrypted tunnel end to end wherein each partner is identified with a different VPN group/password.

In accordance with an embodiment of the present invention a method of enabling collaboration by owners of a collaborative network with partners such as sub-contractors, customers and/or Electronic Design Automation (EDA) vendors without compromising Intellectual Property is provided herein by providing by the owner a highly secure common resource computing environment with services from design to production wherein data input and output remains on the common resource. The highly secure resource is provided by multiple layers of security to engagement boxes with the computing environment where the partners can work simultaneously in multiple teams, run simulation tests, emulate software problems and share intellectual property in a secure zone with just the remote display going back to the engagement box and therefore to the partner outside the owner.

DESCRIPTION OF PREFERRED EMBODIMENTS

According to one embodiment of the present invention access from sub-contractors, customers and Electronic Design Automation (EDA) vendors to the manufacturer's such as Texas Instruments Incorporated computing environment without compromising Intellectual Property is provided by a full suite of Design automation applications from design to production. This interactive design compute environment in which customers can work jointly with the technical people and other representatives of Texas Instruments Inc. to create and test designs in a highly secure "Design Zones" promote collaboration between Texas Instruments Incorporated (the manufacturer and owner of the computing environment) and its customers and offer flexibility in the compute and design process. Because the zones are so secure, they help give customers the confidence they need to share design intellectual property with Texas Instruments Incorporated representatives and subcontractors for the purpose of completing a project and increasing the value of a joint design.

Design zones allow designers with access to the zones to compute as they would from a common UNIX desktop. They login to a highly secure Texas Instruments Incorporated network through the Internet, direct leased lines and/or the Texas Instruments Incorporated Intranet. They must pass through multiple layers of security. Once they reach the "engagement zones" Texas Instruments engineers and other representatives and their business partners can work simultaneously in multiple teams, run simulation tests, emulate software problems and share intellectual property in a secure zone.

Figure 1:
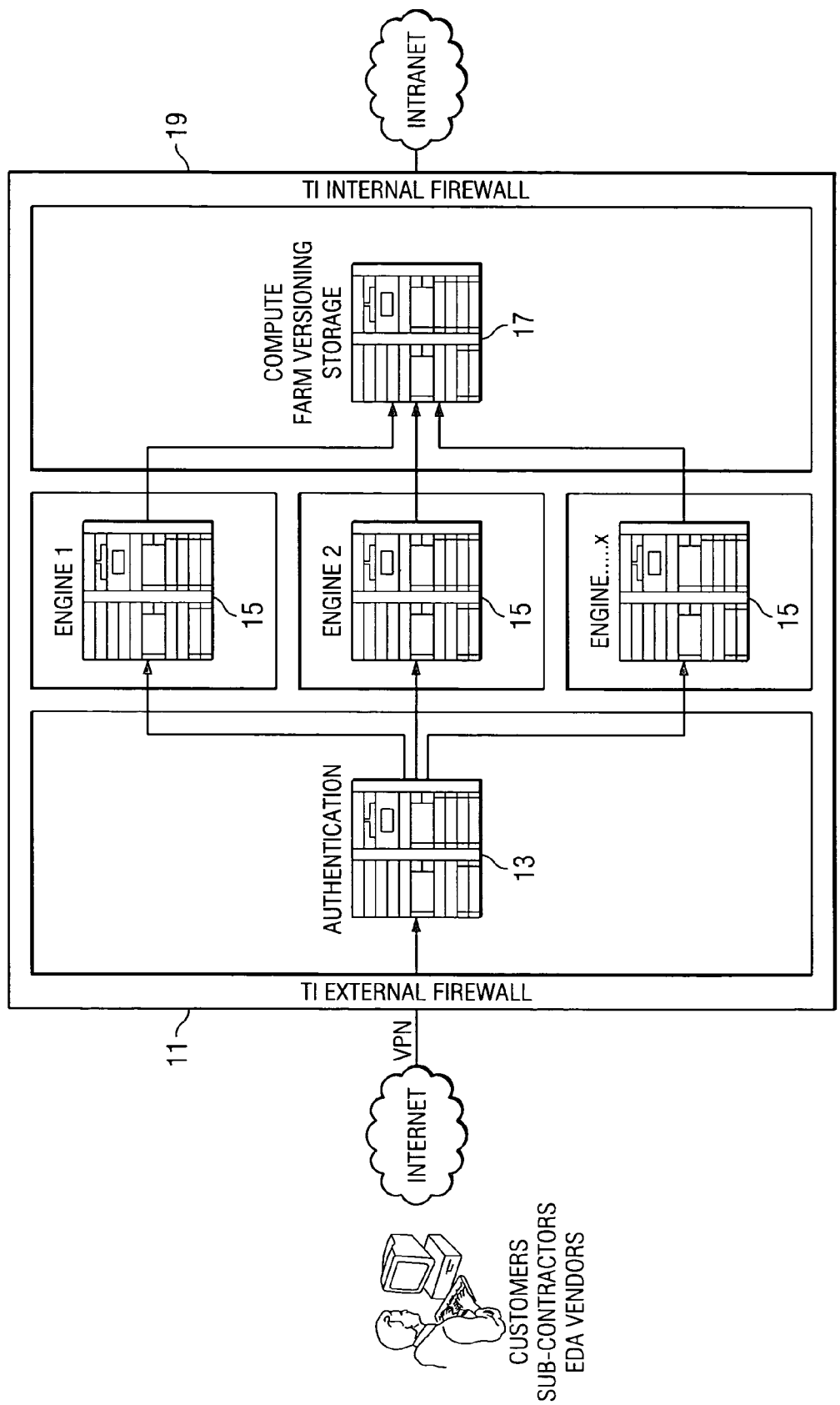
FIG. 1 illustrates access to the compute farm versioning storage according to one embodiment of the present invention.

FIG. 1 illustrates Customers, Sub-contractors, and EDA Vendors (partners) accessing the Internet and through the VPN and TI external firewall 11 to the authentication 13. The access after authentication the communication then passes on to the appropriate isolated engagement boxes 15 and to the computer farm versioning storage 17. All machines in the system cannot access Texas Instruments Incorporated Intranet. They are blocked by the TI internal firewall 19 with the exception of the Network Time Protocol, license machines for EDA applications and a few Mail functionalities (SMPT port 25). Data produced in the system is replicated internally through the backend network or through the outside perimeter on a regular basis, and this is always initiated from inside, namely from the Intranet.

A Texas Instruments Incorporated Design Zone security administrator monitors the activities to make sure no information leaves the site. Design engineers are restricted from removing any intellectual property from the engagement zone and a security administrator controls all movements of data. For added protection, a "co-session" management tool allows the designated zone lead engineer to monitor what the parties are doing in the zone.

Figure 2:
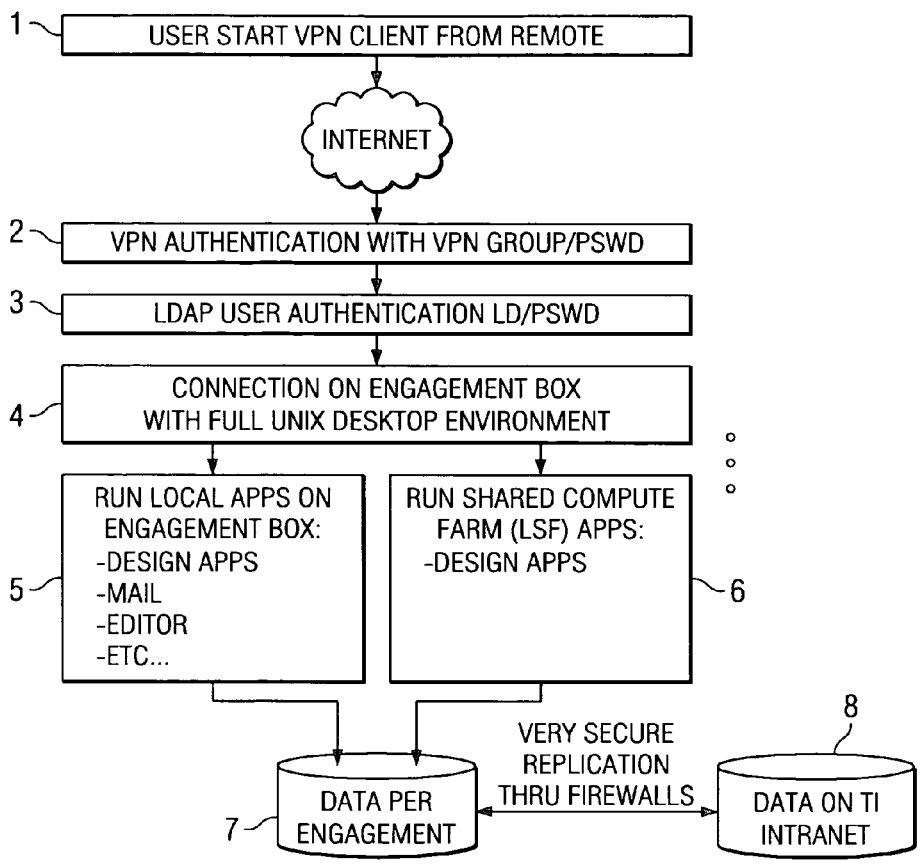
FIG. 2 is a flow diagram according to one embodiment of the present invention.

Referring to FIG. 2, a flow chart of the process is illustrated. The user partner (Step 1) starts a Virtual Private Network (VPN) client from a remote. A VPN is a wide area communication network provided by a common carrier that provides what seems like dedicated lines when used, but backbone trunks are shared among all customers as in a public network. A VPN tunnel is established between the partners (customers and suppliers) workstations (any machine that can run VPN software) to establish a secure encrypted tunnel end to end (VPN concentrator). A VPN concentrator joins several communications channels together. Each partner is identified with a different VPN group/password (Step 2). A tunnel simply refers to a single logical channel over which sessions that normally do not share a logical channel are sent. The tunnel created in a VPN connection is a logical point-to-point connection that supports authentication and encryption of data from one endpoint of the tunnel to the other. The tunneling hides the original packet inside a new packet. For routing through the tunnel, the address of the tunnel endpoint is provided in the outside (new) packet's header, which is called the encapsulation header. The final destination address is inside, in the original packet's header. When the packet reaches the tunnel's endpoint destination, the encapsulation header is stripped off and the original packet delivered to the final destination. Tunnels can be established at different layer such as data link layer or network layer. In VPN there are three types of protocols. There is the tunneling protocol to establish the tunnel. The encryption protocol is used to secure the data. There is the network/transport protocol or LAN protocol to communicate on the private network. The VPN is the first level of authentication.

Partners start a session in a Worldwide Web (Web) page using thin client technology such as Citrix Independent Computing Architecture (ICA). This session is launched on a Portal machine that will authenticate through Lightweight Directory Access Protocol (LDAP) the user identification and password of the user (Step 3). The LDAP allows the directory user agent to give users access to directory services to communicate with the directory system agent that manages the directory data. This is the second level of authentication.

Depending on the person identified by the LDAP in Step 3 above, the session will be routed to one of many engagement boxes that are on the Ethernet segments separated by Firewall boxes where in Step 4 another login/password is required and is validated thru LDAP. LDAP boxes are on the common resource segments. All users of the same partner are all launching on the same engagement box, which guarantee a high level of security. An engagement box includes a server with an operating system like UNIX. From that engagement box they have access to data and applications on the Network File System (NFS) storage system (Step 7) and access is also controlled by the LDAP mechanism for security purposes. NFS is a distributed file system from SunSoft that allows data to be shared across a network regardless of machine, operating system, network architecture or protocol. This de facto UNIX standard lets remote files appear as if they were local on a user's machine. The partners can run local applications on the engagement box (Step 5) such as design applications, mail, editor, etc or on the server farm (Step 6) that resides on the common resources segment for bigger batch or interactive jobs. Doing that, data input and output remains on the common resource, just the remote display is going back to the engagement box (X11 protocol) and to a remote client device, via an ICA session, to the partner outside the owner such as Texas Instruments Incorporated. All critical data remains in the Texas instruments Incorporated premises design zone. All machines in the design zone cannot access the TI Intranet because they are blocked by the firewall 19 with the exception of the Network Time Protocol, license machines for EDA applications and a few mail functionalities (SMTP port 25). Data produced in the system is replicated internally through the backend network or through the outside perimeter on a regular basis, and this is always initiated from inside, namely from the TI Intranet via the TI internal firewall. As discussed previously a Design Zone security administrator monitors the activities to make sure no information leaves the site and design engineers are restricted from removing any intellectual property from the engagement zone and the security administrator controls all movements of data. For added protection, a "co-session" management tool allows the designated zone lead engineer to monitor what the parties are doing in the zone.

Figure 3:
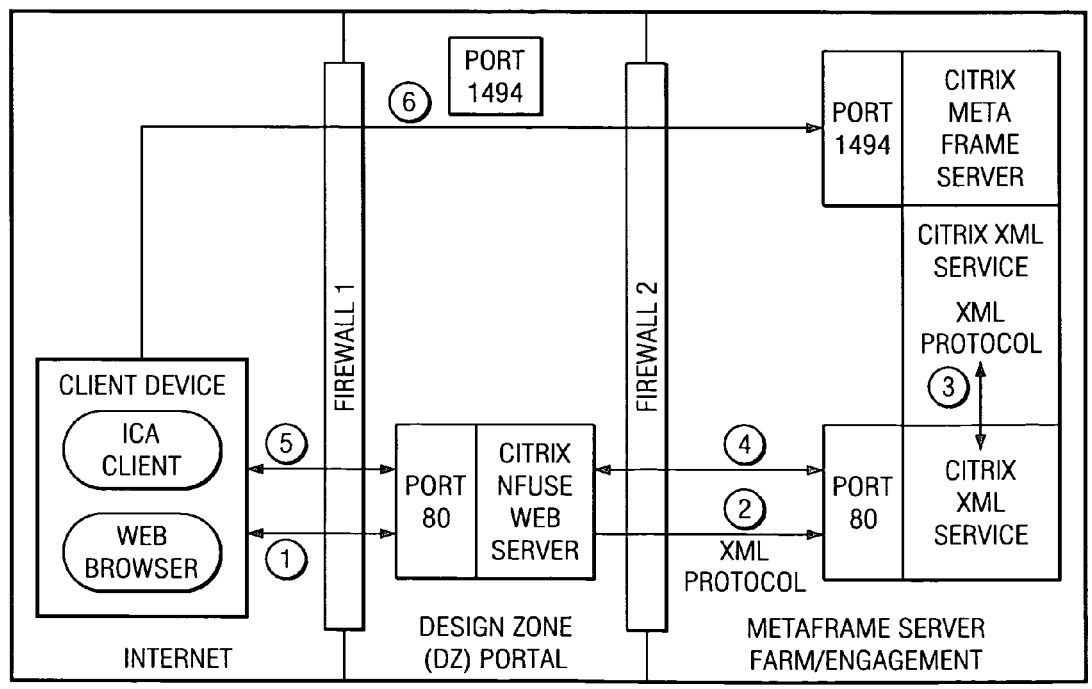
FIG. 3 illustrates how a session is started on a port and when authenticated data is sent on a different port.

FIG. 3 illustrates an example of how a session is started on port 80 and then when session is authenticated data are going on to port 1494. The client device on the Internet containing the ICA client and the web browser communicates with the Citrix NFuse Web server at port 80 in the design zone portal through the first firewall (Firewall 1). NFuse enables one to integrate interactive applications into standard Web browsers such as Netscape or Microsoft Internet Explorer. The web server communicates using the XML protocol to port 80 on server farm through the second firewall (Firewall 2) and responds back. NFuse also enables joining several servers in a group to create the server farm. Note the Citrix MetaFrame Sever in the farm or engagement. Within the farm, one can perform load balancing, license pooling, and application publishing. When the session is authenticated data can be sent on a different port 1498.

Figure 4A:
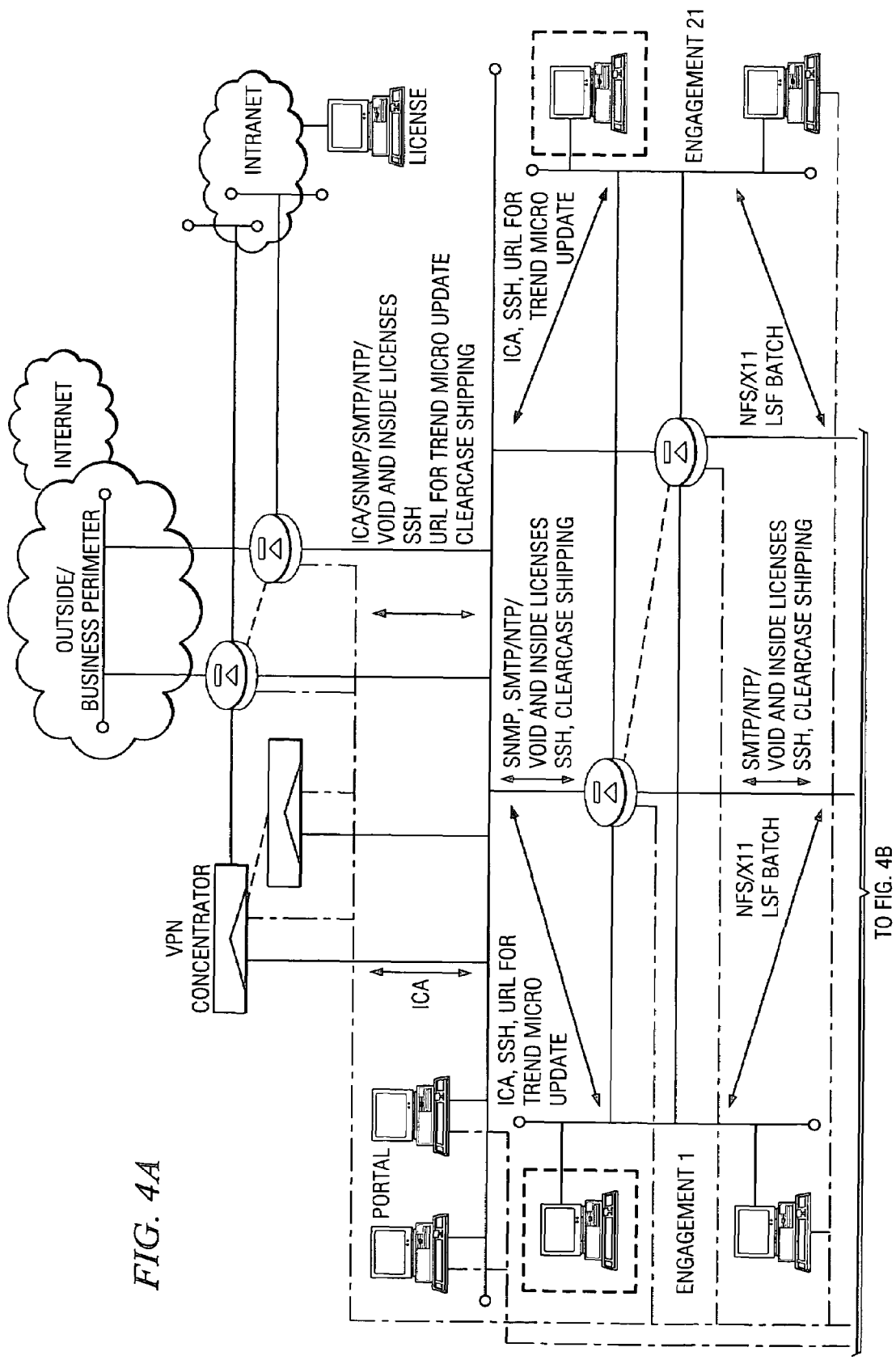
FIGS. 4A and 4B illustrate a system design according to one embodiment of the present invention and illustrates which protocols are allowed from where to where to guarantee security.
Figure 4B:
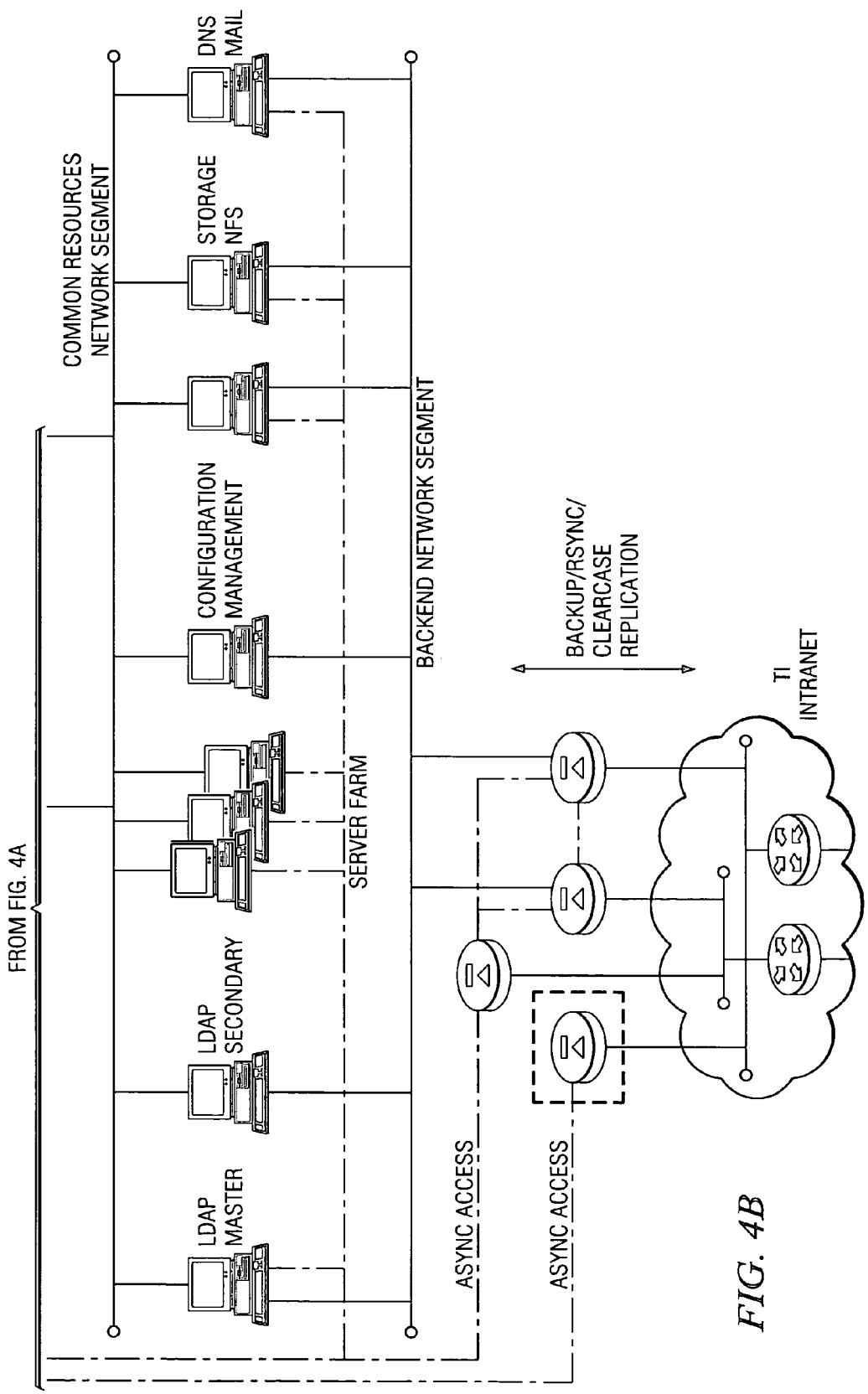

FIGS. 4A and 4B is a schematic diagram of the system and illustrates which protocol is allowed from where to where to guarantee security. The partners may access through the outside/business perimeter using the Internet as illustrated at the top of the drawing. A licensee may access the system through an Intranet link. The access is through routers and through secure mechanism such as SSH. SSH utilizes strong encryption and authentication. SSH can be installed on a private network's firewall, and a tunnel can be established from SSH client with dialup Internet access to the firewall. The input from the Internet is through VPN concentrator using a VPN tunnel. The Partners start an ICA session in a WEB page. This session is launched on a Portal machine that will authenticate through Lightweight Directory Access Protocol (LDAP) the user identification and password of the user. Depending on the person that will authenticate through Lightweight Directory Access Protocol (LDAP) the user/password of the person, then another login/password is required and is validated thru LDAP. All users of the same partner are all launching on the same engagement box, which guarantee a high level of security. This is the second LDAP and third level of security. From that box they have access to data and applications on the Network File System (NFS) storage thru a LDAP mechanism for security purposes. There are illustrated engagement boxes 1 thru 21. The common resource segment includes the server farm, the storage NFS, DNS mail, the LDAP master and secondary LDAP. The backend Network segment includes the TI or owner's Intranet. This backend segment is mostly used for backup purposes of data in common resources as well as for data replication between Intranet and Common resource area. The async access box is used for management of all the critical boxes in the Design Zone from the Intranet thru a Terminal server box to guarantee security.

Figure 5:
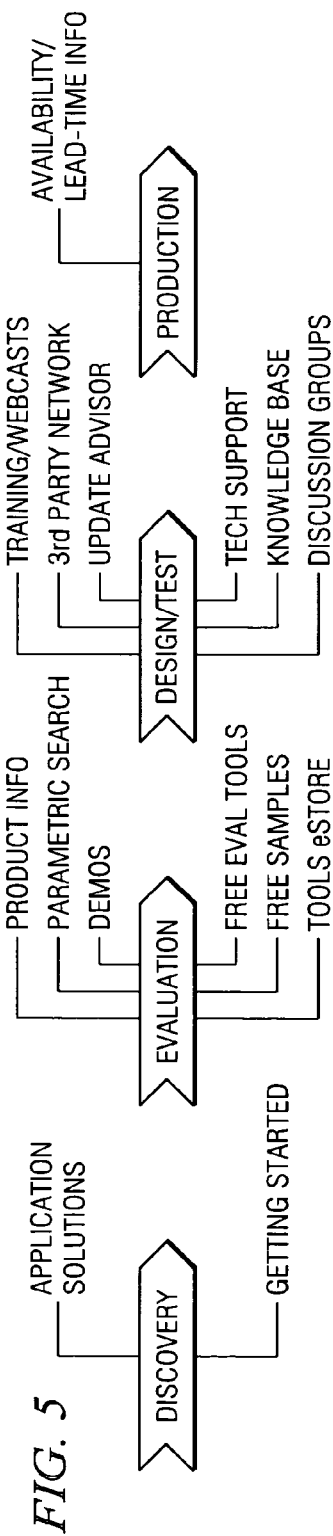
FIG. 5 illustrates the collaborative web-based services from design to production.

Texas Instrument Incorporated provides a full suite of web-based services to customers who do not have the system capability to connect directly to Texas Instruments Incorporated networks. FIG. 5 illustrates the collaborative Design Automation application services from design to production. At the discovery stage there are presented application solutions. At the evaluation stage there is product information, parametric search, demos, free evaluation tools, free samples and tools eStore. At the design/test stage there is training/Webcasts, third party network, update advisor, technical support, knowledge base and discussion groups. At the production stage there is availability information and lead time information.

Figure 6:
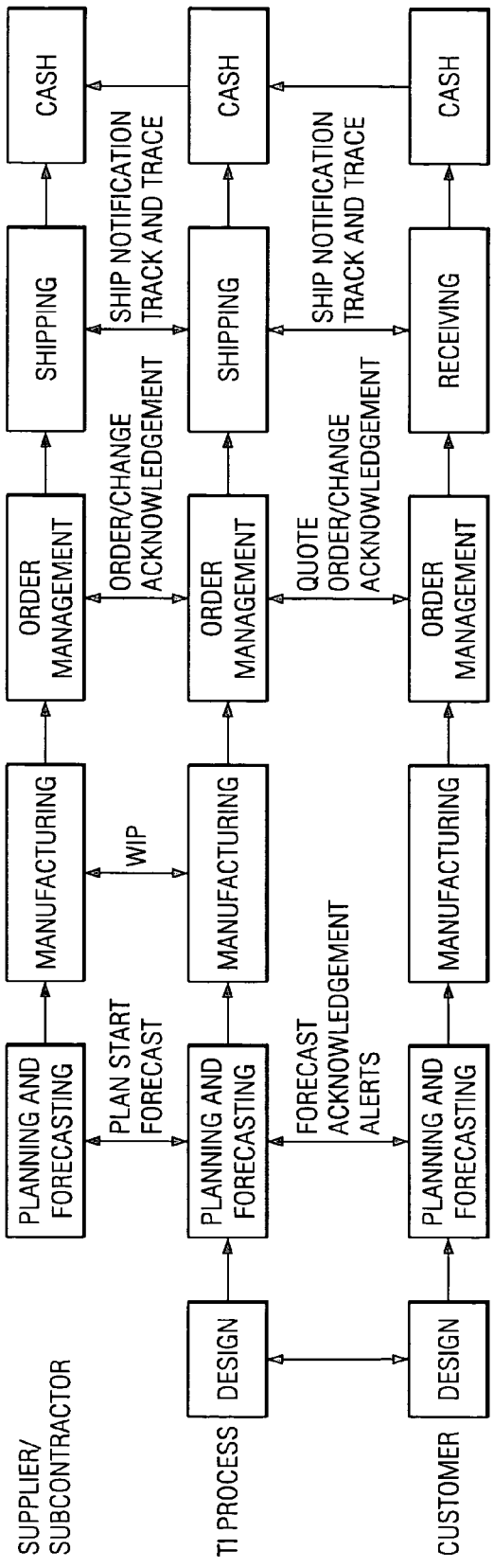
FIG. 6 illustrates the collaborative process services from design through shipping and receiving.

FIG. 6 illustrates the collaborative process from design through shipping and receiving. In the design stage the collaborative design services include secure collaborative design zones, linked IT infrastructures across design partners, web-based program management and product delivery workflow tools and customer co-simulations and consolidated design storage. During planning and forecasting the services are short and long term forecasting and response, proactive messaging/alerts, replenishment models adapted to customer needs, and leading on RosettaNet standards related to planning and forecasting. During order management the services are quote management (create and change), order management (create and change and status), order acknowledgements, material tracking (ship notices, inventory, WIP), and leading on EDI, RosettaNet, and barcode standards usage and definition. The collaborative services for supplier for manufacturing include electronic-catalog for self-service ordering, multiple integration options (EDI/RosettaNet, XML or Web), Web contract management, material specification available via the Web, Web PO, invoice and acknowledgement, and logistics track and trace. The collaborative services for subcontractors for manufacturing include forecast management, purchase order management, inventory management, planning management, receiving management and shipment tracking. The distributor collaboration services during shipping and receiving include multiple integration options (EDI, RosettaNet, Web), quote management (create and change), order management (create, change, and status), order acknowledgements, shipment notices and tracking, price list, ship and debit processing, design registration, inventory reporting and resale management.

While the invention has been particularly shown and described with reference to a preferred embodiment, it will be understood by those skilled in the art that various changes in form and detail may be made without departing from the spirit and scope of the invention.

The invention claimed is:

1. A method for providing secure access of a partner to the development environment of another partner comprising the steps of:

starting a VPN tunnel between workstations to establish a secure encrypted tunnel end to end wherein each partner is identified with a different VPN group/password;

starting a session by the partner in a Web page on a portal machine that authenticates through LDAP (Lightweight Directory Access Protocol) the user identification and password of a user;

routing the session to an engagement box of a plurality of engagement boxes depending on the user where the engagement box includes a server with an operating system and each of said engagement boxes are on network segments separated by firewall boxes with another logon/password and is validated thru second LDAP and wherein all users of the same partner are all launching on the same engagement box;

accessing data and applications from that engagement box on Network File system storage authenticated second LDAP to get benefit of a big compute server farm composed of many high-end servers in a secure way; submitting batch or interactive jobs to said server farm on a common resource segment so data input and data output on the server farm remains on the common resource segment; and a display is sent back to appropriate partner's engagement box and then a remote display at the partner location.

2. The method of claim 1 including the step of only a remote display is going back to a client device of the partner.

3. A method of enabling a collaborative network with partners without compromising Intellectual Property comprising the steps of:

providing a secure common resource computing zone with services such as design and production wherein data input and output remains on the secure common resource computing zone;

providing multiple layers of security to separate isolated engagement boxes for each of the partners in said secure common resource computing zone where the engagement boxes each include a server with an operating system and where partners can work simultaneously, run simulation tests, emulate software problems and share in said secure common resource computing zone with just a remote display going back to the engagement box of the partner and therefore to the partner outside the owner; and submitting batch or interactive jobs to a server on said common resource computing zone so data input and data output on the server on said common resource remains on said common resource computing zone but just a remote display is going back to the engagement box of the partner and then remote display at the partner location.

4. The method of claim 3 including the step of said partners running local applications on said engagement boxes such as design applications, mail, editor, etc. or on a server farm segment that resides on the secure common resource computing zone for bigger batch or interactive jobs.

5. The method of claim 3 including the step of providing a backend segment that includes an intranet access through a firewall to an owner's intranet.

6. The method of claim 5 including the step of providing an access box for management of all critical boxes in said secure computing zone.

7. The method of claim 3 wherein said providing layers of security step includes the steps of:

starting a VPN tunnel between workstations to establish a secure encrypted tunnel end to end wherein each partner is identified with a different VPN group/password;

starting a session by the partner in a Web page on a portal machine that authenticates through LDAP user identification and password of a user;

routing the session to an engagement box depending on the user where the engagement boxes are on network segments separated by firewall boxes with another logon/password and is validated thru second LDAP and wherein all users of the same partner are all launching on the same engagement box;

said engagement box including a server with an operating system; and accessing data and applications from that engagement box on Network File system storage authenticated second LDAP to get benefit of a big compute farm composed of many high-end servers in a secure way.

8. A system for providing secure access of a partner to the development environment of another partner comprising:

means for providing a VPN tunnel between workstations to establish a secure encrypted tunnel end to end wherein each partner is identified with a different VPN group/password;

means for starting a session by the partner in a Web page on a portal machine that authenticates thru LDAP user identification and password of a user;

means for routing the session to an engagement box depending on the person where engagement boxes are on network segments separated by firewall boxes with another logon/password and is validated thru second LDAP and wherein all users of the same partner are all launching on the same engagement box; said engagement box including a server with an operating system; and means for accessing data and applications from that engagement box on Network File system storage authenticated second LDAP to get benefit of a big compute farm composed of many high-end servers in a secure way.

9. The system of claim 8 including means for submitting batch or interactive jobs to a server farm on a common resource segment so data input and data output on the server farm remains on the common resource segment but a remote display is going back to the engagement box and then remote display at the partner location.

10. A system for enabling collaboration by an owner of a collaborative network with partners such as sub-contractors, customers and/or Electronic Design Automation (EDA) vendors without compromising Intellectual Property comprising:

a secure common resource computing zone with services wherein data input and output remains on the secure common resource computing zone;

means for providing multiple layers of security to separate isolated engagement boxes for each partner in said secure common resource computing zone where said engagement boxes each include servers with an operating system where the partners can work simultaneously, run simulation tests, emulate software problems or share in said secure common resource computing zone with just a remote display going back to the engagement box of the partner and therefore to the partner outside the owner and means for submitting batch or interactive jobs to a server on said common resource computing zone so data input and data output on the server on said common resource remains on said common resource computing zone but just a remote display is going back to the engagement box of the partner and then remote display at the partner location.

11. The system of claim 10 wherein said partners can run local applications on said engagement boxes such as design applications, mail, editor, etc or on a server farm segment that resides on the common resources zone for bigger batch or interactive jobs.

12. The system of claim 10 including a backend segment that includes an owner's intranet access through a firewall to an owner's intranet.

13. The system of claim 12 including an access box for management of all critical boxes in said secure computing zone.

14. The system of claim 10 wherein said means for providing security includes means for providing a VPN tunnel between workstations to establish a secure encrypted tunnel end to end wherein each partner is identified with a different VPN group/password; means for starting a session by the partner in a Web page on a portal machine that authenticates thru LDAP user identification and password of a user;

means for routing the session to an engagement box depending on the person where the engagement boxes are on network segments separated by firewall boxes with another logon/password and is validated thru second LDAP and wherein all users of the same partner are all launching on the same engagement box;

said engagement box including a server with an operating system and means for accessing data and applications from that engagement box on Network File system storage authenticated second LDAP to get benefit of a big compute farm composed of many high-end servers in a secure way.

* * * * *